United States Patent
McMillan et al.

(10) Patent No.: US 8,375,230 B2
(45) Date of Patent: Feb. 12, 2013

(54) MANAGING HEAT DISSIPATION WHILE TESTING A POWER DEVICE

(75) Inventors: Christopher R. McMillan, San Jose, CA (US); Darren K. Hopcroft, San Jose, CA (US); Anoop Vetteth, Fremont, CA (US); Sandeep A. Patel, Los Gatos, CA (US); Francois J. Gautier-Le Boulch, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 448 days.

(21) Appl. No.: 12/783,602

(22) Filed: May 20, 2010

(65) Prior Publication Data

US 2011/0285450 A1 Nov. 24, 2011

(51) Int. Cl.
*G06F 1/00* (2006.01)
*H04L 12/26* (2006.01)
(52) U.S. Cl. .................. 713/300; 370/249
(58) Field of Classification Search ............ 713/300, 713/340; 700/295; 370/249
See application file for complete search history.

(56) References Cited

U.S. PATENT DOCUMENTS

| | | | |
|---|---|---|---|
| 7,002,354 B1 | 2/2006 | Pannell et al. | |
| 7,161,393 B1 * | 1/2007 | Potanin et al. | 327/108 |
| 7,362,590 B2 | 4/2008 | Coffey et al. | |
| 7,459,886 B1 * | 12/2008 | Potanin et al. | 320/135 |
| 7,532,017 B2 | 5/2009 | Anderson | |
| 7,627,398 B1 | 12/2009 | Bennett et al. | |
| 2004/0085059 A1 * | 5/2004 | Smith | 324/158.1 |
| 2004/0102916 A1 * | 5/2004 | Chen et al. | 702/117 |
| 2007/0284946 A1 * | 12/2007 | Robbins | 307/18 |
| 2009/0327558 A1 * | 12/2009 | Landry et al. | 710/301 |
| 2010/0007334 A1 * | 1/2010 | Apfel | 324/123 R |
| 2011/0258464 A1 * | 10/2011 | Gammel et al. | 713/300 |
| 2012/0039188 A1 * | 2/2012 | Fan | 370/249 |

* cited by examiner

Primary Examiner — Khanh Dang
(74) Attorney, Agent, or Firm — Baker Botts L.L.P.

(57) ABSTRACT

According to certain embodiments, an apparatus comprises port interfaces, charge storage devices, and a charge combiner coupled to a circuit board. Each charge storage device is associated with a port interface. Each port interface receives a current of charge from a device under test and pumps the charge to an associated charge storage device at a predetermined rate. Each charge storage device stores the charge from an associated port interface. The charge combiner combines the charge from the charge storage devices to yield a combined charge and feeds the combined charge to an output regulator.

20 Claims, 5 Drawing Sheets

MANAGING HEAT DISSIPATION WHILE TESTING A POWER DEVICE

TECHNICAL FIELD

The present disclosure relates generally to circuit boards.

BACKGROUND

Power over Ethernet (PoE) technology is used to pass electrical power, along with data, on Ethernet cabling. PoE supply ports of a PoE board may be tested using a test card. In certain situations, testing may generate heat that may need to be dissipated.

DESCRIPTION OF EXAMPLE EMBODIMENTS

Overview

According to certain embodiments, an apparatus comprises port interfaces, charge storage devices, and a charge combiner coupled to a circuit board. Each charge storage device is associated with a port interface. Each port interface receives a current of charge from a device under test and pumps the charge to an associated charge storage device at a predetermined rate. Each charge storage device stores the charge from an associated port interface. The charge combiner combines the charge from the charge storage devices to yield a combined charge and feeds the combined charge to an output regulator.

Description

Figure 1:
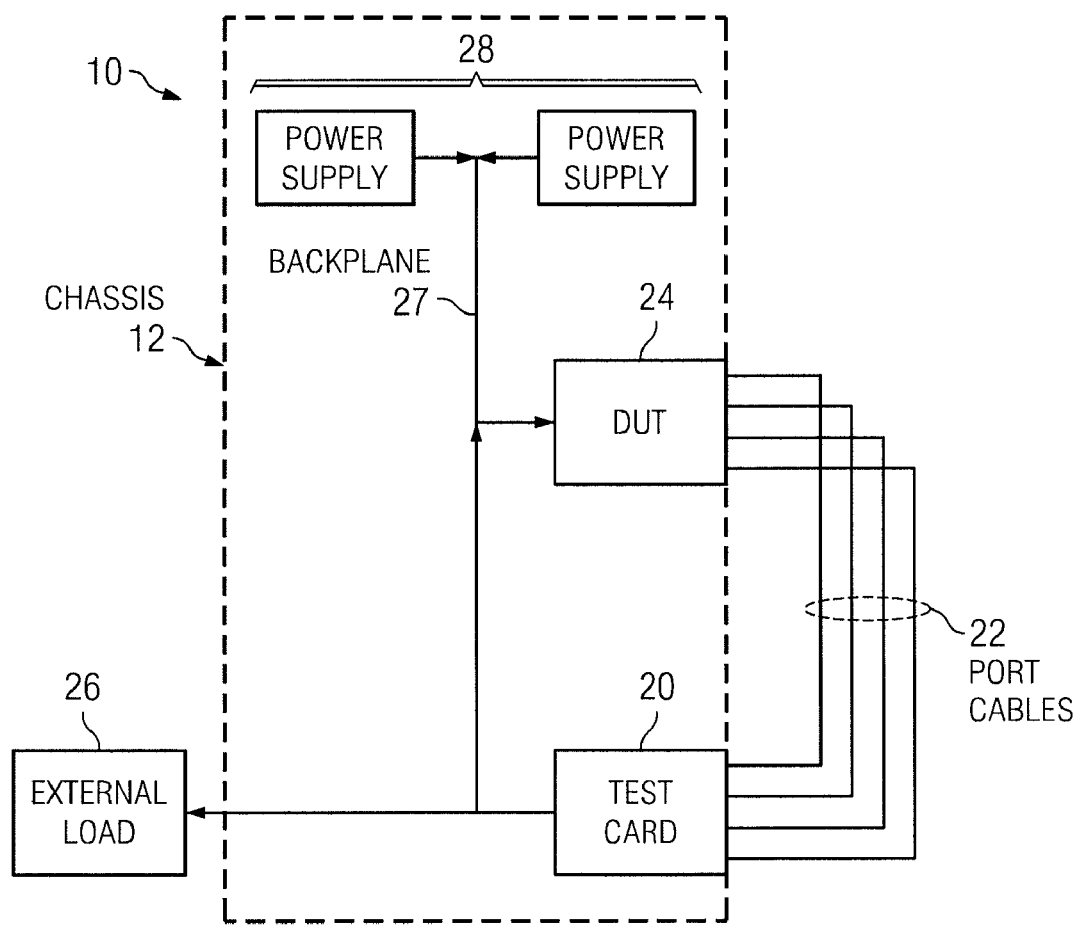
FIG. 1 illustrates an example of a system that may be used to test ports of a device under test.

FIG. 1 illustrates an example of a system 10 that may be used to test ports of a device under test (DUT). In certain embodiments, test card 20 may be used to test Power over Ethernet (PoE) supply ports. In the embodiments, test card 20 draws a specified amount of current from each test port and then combines the power. The combined power may be bussed to be circulated to a backplane for re-use or to be dissipated by a load external to test card 20. Bussing the combined power may reduce power dissipated by the individual test ports, which may allow for a higher port count for the same power density on test card 20 than would be allowed if the combined power was not bussed.

In the illustrated example, system 10 includes a chassis 12, a test card 20, port cables 22, a device under test 24, an external load 26, a backplane 27, and one or more power supplies 28 (28a-b) coupled as illustrated. Test card 20 may be disposed in any suitable location, for example, inside of or outside of chassis 12. In certain embodiments, chassis 12 may be any suitable housing configured to support components 20 through 28 and provide connections between components. Device under test 24 may be any suitable device that has ports that may be tested. In certain embodiments, device under test 24 may be a PoE device with PoE ports. PoE may refer to PoE as defined in any suitable standard relating to PoE, such as IEEE 802.3x, where x represents any value of a standard relating to PoE, for example, x=af. Port cables 22 couple test ports of device under test 24 with ports of test card 20. Port cables 22 may be Ethernet cables.

In certain embodiments, test card 20 includes port interfaces, charge storage devices, and a charge combiner coupled to a circuit board. Each charge storage device is associated with a port interface. A port interface receives a current of charge from device under test 24 and pumps the charge to an associated charge storage device at a predetermined rate. A charge storage device stores the charge from an associated port interface. The charge combiner combines the charge from the plurality of charge storage devices to yield a combined charge, and feeds the combined charge to an output regulator.

The power from the combined charge (or "combined power") may be handled in any suitable manner to reduce the amount of power that is dissipated as heat. In certain embodiments, the power may be recirculated to backplane 27. In other embodiments, the power may be dissipated by external load 26. In other embodiments, the power may be both recirculated and dissipated.

In certain embodiments, external load 26 may be any load suitable for dissipating at least some of the combined power. In the embodiments, external load 26 may be substantially thermally separated from test card 20 such that heat from dissipating the combined power does not affect test card 20. An example of external load 26 is described in more detail with reference to FIG. 7.

In certain embodiments, backplane 27 is a circuit board that couples printed circuit boards. Backplane 27 may connect connectors in parallel to each other, so that each pin of each connector is linked to the same pin of the other connectors, forming a computer bus.

In certain embodiments, power supplies 28 may supply power for the testing of device under test 24. In certain embodiments, power supply 28 may initially supply power. After the port power is turned on, test card 20 may be the primary power supplier. Power supplies 28 may operate as secondary power suppliers that supply any additional power needed.

Figure 2:
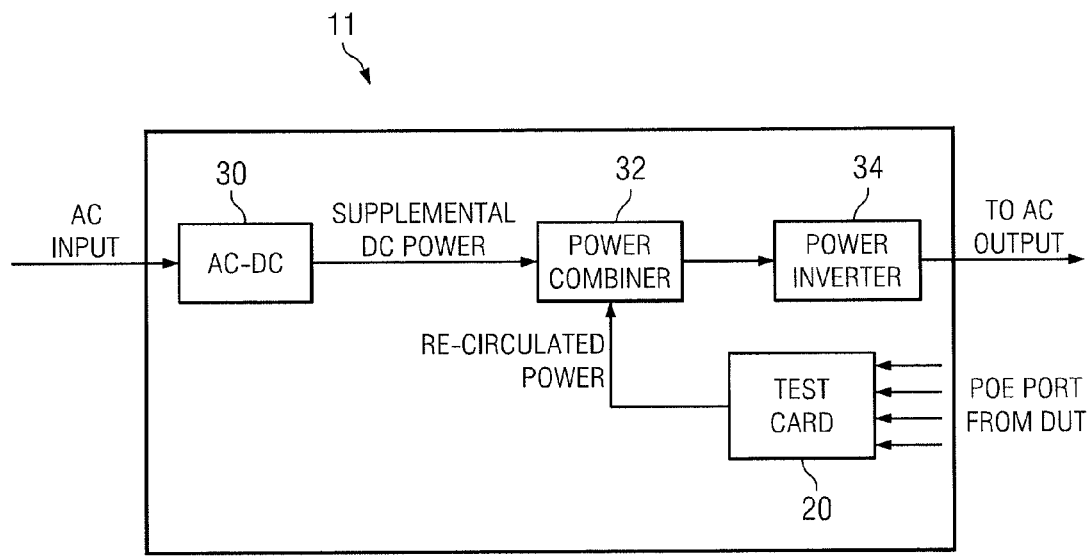
FIG. 2 illustrates an example of power use in a system that may be used to test ports of a device under test.

FIG. 2 illustrates an example of power use in system 10. In the illustrated example, a system 11 includes test card 20, an alternating current to direct current supply (AC-DC) 30, a power combiner 32, and a power inverter 34 coupled as shown. In certain embodiments, test card 20 may output the combined power to power combiner 32. Power combiner 32 may draw current from test card 20 and AC-DC 30 in order to maintain current demand on an AC output. Power combiner 32 may place a higher priority on re-circulated power from test card 20 over supplemental DC power from AC-DC 30. The AC output power may be greater than or equal to the input power from device under test 24 to maintain proper current regulation.

Figure 3:
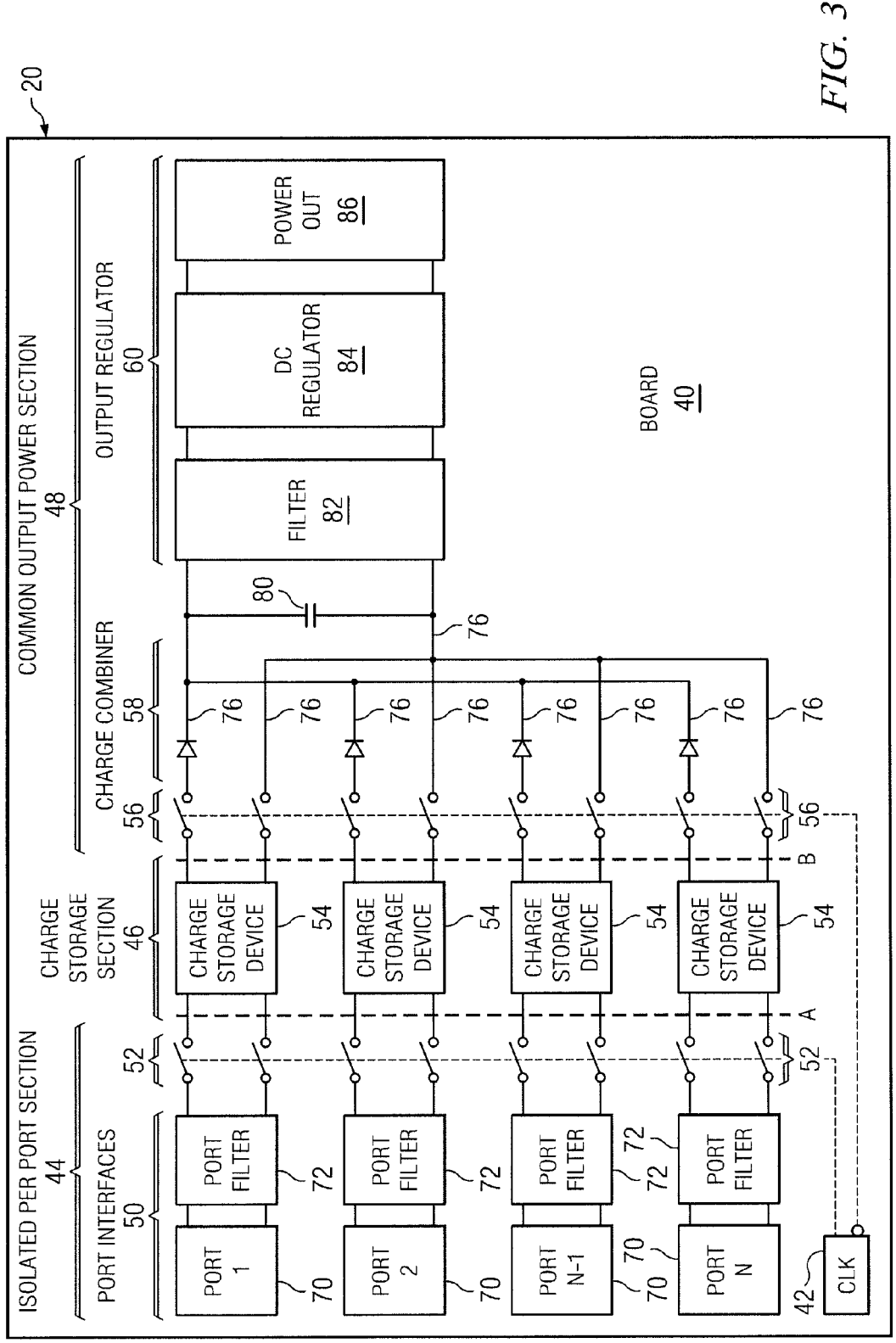
FIG. 3 illustrates an example of a test card that may be used to a test device under test.

FIG. 3 illustrates an example of a test card 20 that may be used to test device under test 24. In the illustrated example, test card 20 includes a clock 42, an isolated per port section 44, a charge store section 46, and a common output power section 48. In certain embodiments, isolated per port section 44 pumps current into per port charge storage devices of charge store section 46. Common output power section 48 combines the charge and feeds the combined charge to an output regulator. Common output power section 48 may drive the power associated with the combined charge (or combined power) back into the backplane or to an external load.

In the illustrated example, test card 20 includes port interfaces 50, first switches 52, charge storage devices 54, second switches 56, a charge combiner 58, and an output regulator 60 coupled as shown. A port interface 50 includes a port 70 and a port filter 72. Charge combiner 58 includes busses 76. Output regulator 60 includes a capacitor 80, a filter 82, a DC regulator 84, and a power output 86. In certain embodiments, test card 20 may be designed as a multiple isolated input DC to DC converter.

In certain embodiments, circuit board 40 comprises any suitable substrate that is operable to support and couple components 42 through 86 of test card 20. Circuit board 40 may comprise one or more pieces. Clock 42 provides a switching frequency.

In certain embodiments, isolated per port section 44 pumps current into per port charge storage devices 54 of charge storage section 46. In certain embodiments, a port interface 50 receives a current of charge from a device under test and pumps the charge to an associated charge storage device 54 at a predetermined rate. The rate may be determined in any suitable manner. For example, the rate may depend on the PoE class as defined in the IEEE 802.3af standard. A port interface 50 includes a port 70 and a port filter 72. A port 70 may have any suitable power capability, for example, a power capability with a value in the range of less than 30, 30 to 60, or greater than 60 watts (W). Ports 70 may be substantially isolated from each other. In certain embodiments, port filter 72 may be used to monitor the DC current at each port interface 50. In certain embodiments, each first switch 52 operates in a closed state to feed the current from a port interface 70 to an associated charge storage device 54. An example of isolated per port section 44 is discussed in more detail with reference to FIG. 4.

In certain embodiments, charge storage section 46 stores electrical charge. In the embodiments, a charge storage device 54 may store charge from an associated port interface 70. A charge storage device 54 may comprise any suitable components that may be configured to store the charge, such as capacitors. An example of charge store section 46 is described in more detail with reference to FIG. 5.

In certain embodiments, common output power section 48 combines the charge and feeds the combined charge to output regulator 60. In certain embodiments, each switch 56 operates in a closed state to feed the current from a charge storage device 54 to charge combiner 58. In certain embodiments, charge combiner 58 combines the charge from charge storage devices 54 to yield a combined charge, and feeds the combined charge to output regulator 60. In certain embodiments, charge combiner 58 comprises busses coupled (such as electrically coupled) together to yield a combined bus. An example of common output power section 48 is described in more detail with reference to FIG. 6.

In certain embodiments, output regulator 60 regulates the output power. In the embodiments, output regulator 60 includes a capacitor 80, a filter 82, a DC regulator 84, and a power output 86. Filter 82 may AC filter the combined power. DC regulator 84 may DC regulate the combined power. Power output 86 may output the combined power. In certain embodiments, output regulator 60 feeds the combined charge back to device under test 24, external load 26, and/or backplane 27.

Test card 20 may operate in steady state or transient situations. In a steady state situation, the current draw for ports 70 may be regulating properly. The power demand is the power drawn from DUT 24 by test card 20, and the power input is the sum of the power incident on ports 70. If the power demand exceeds the power input requested, power supplies 28 may provide additional power. If the power demand is less than the power input requested, charge may build up in charge storage devices 54. In a transient situation, the current demand from a port changes, which may result in stored charge exceeding the normal operating range of charge storage devices 54. Charge storage devices 54 may be under voltage or may be over expected output voltage. Charge storage devices 54 may be configured to react to prevent the charged storage from reaching voltage extremes.

Figure 4:
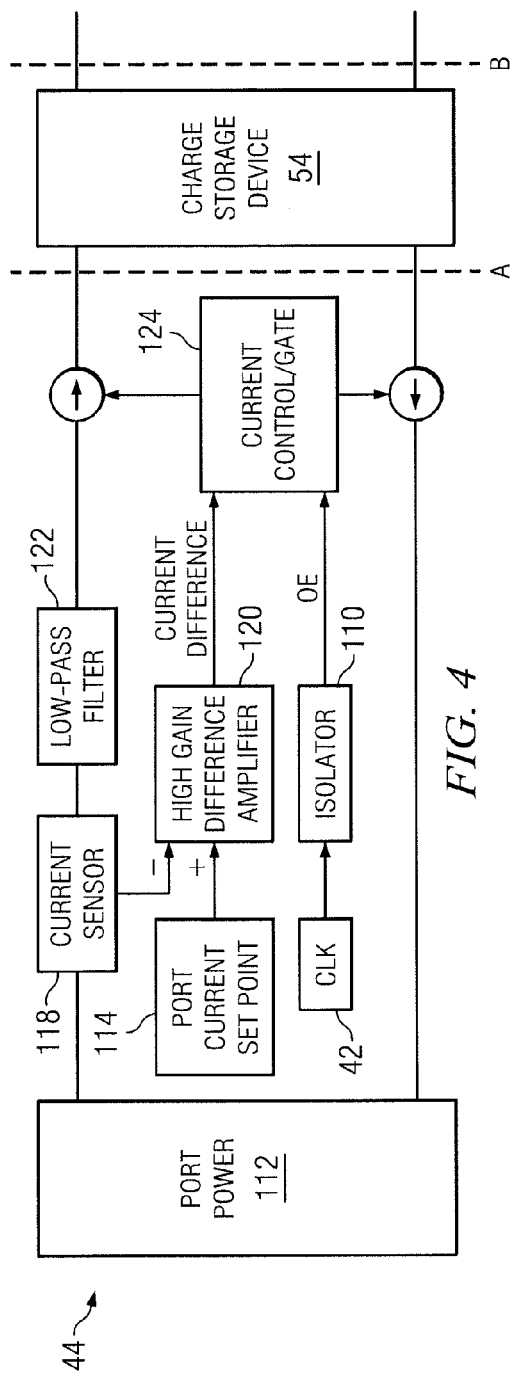
FIG. 4 illustrates an example of an isolated per port section that may be used with the test card of FIG. 3.

FIG. 4 illustrates an example of isolated per port section 44 that may be used with test card 20. In certain embodiments, isolated per port section 44 may operate as a port monitor and monitor the current at each port interface 70. In the illustrated example, isolated per port section 44 includes a port power input 112, a clock source 42, an isolator 110, a port current set point source 114, a current sensor 118, an amplifier 120, a low pass filter 122, and a gate 124.

Port power input 112 receives a port current from port interface 70. Port current set point source 114 provides the predetermined rate, or set point current, at which charge is supplied to charge storage device 54. Current sensor 118 senses the port current. Amplifier 120 determines a current difference between the set point current and the port current and provides the current difference to current control/gate 124. Low pass filter 122 passes low-frequency signals and attenuates high-frequency signals. Clock 42 and isolator 110 provides gate-on enable signal OE to current control/gate 124. Gate 124 controls the amount of current drawn from port interface 70 and provided to charge storage device 54.

Figure 5:
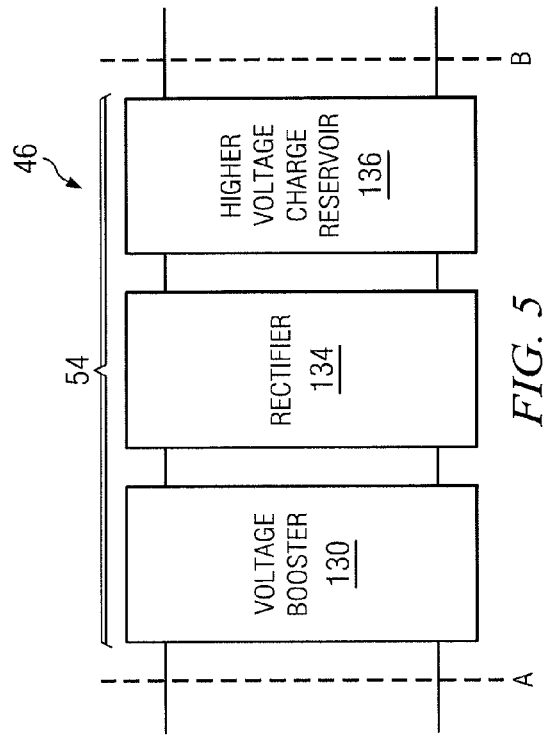
FIG. 5 illustrates an example of a charge storage device of a charge storage section that may be used with the test card of FIG. 3.

FIG. 5 illustrates an example of a charge storage device 54 of charge storage section 46 that may be used with test card 20. In the illustrated example, charge storage device 54 includes a voltage booster 130, a rectifier 134, and a higher voltage charge reservoir 136. In certain embodiments, voltage booster 130 receives input with an input voltage and yields an output with an output voltage that is greater than the input voltage. Rectifier 134 converts alternating current (AC) to direct current (DC). Reservoir 136 stores charge and may be, for example, a capacitor. Reservoir 136 may be a higher voltage charge reservoir with a voltage higher than what is driven to power output 86. Voltage may be less than 47V, 47-50V, 50V-70V, or greater than 70V.

Figure 6:
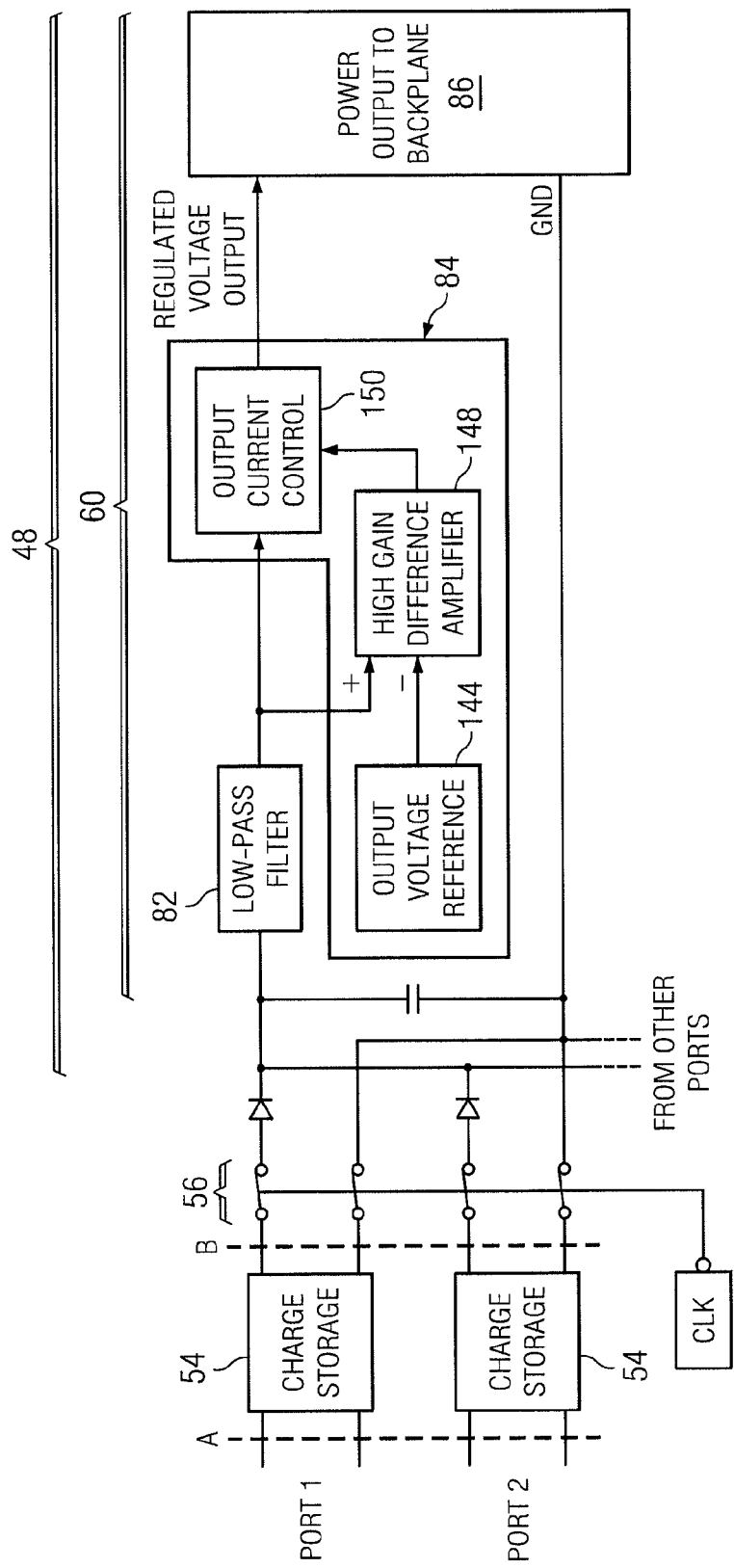
FIG. 6 illustrates an example of a common output power section that may be used with the test card of FIG. 3.

FIG. 6 illustrates an example of common output power section 48 that may be used with test card 20. In the illustrated example, common output power section 48 includes output regulator 60 with a low pass filter 82, a DC regulator 84, and a power output 86. Low pass filter 82 may AC filter the combined power. DC regulator 84 may DC regulate the combined power. DC regulator 84 may include an output voltage reference 144, a high gain difference amplifier 148, and an output current control 150. Output voltage reference 144 provides the output voltage reference to amplifier 148. Amplifier 148 provides the difference between the combined power and the output voltage reference to output current control 150. Output current control 150 controls the combined power according to the difference to yield a regulated voltage output to power output 86. Power output 86 provides the output power to any suitable destination, for example, to the back plane or to external load 26.

Figure 7:
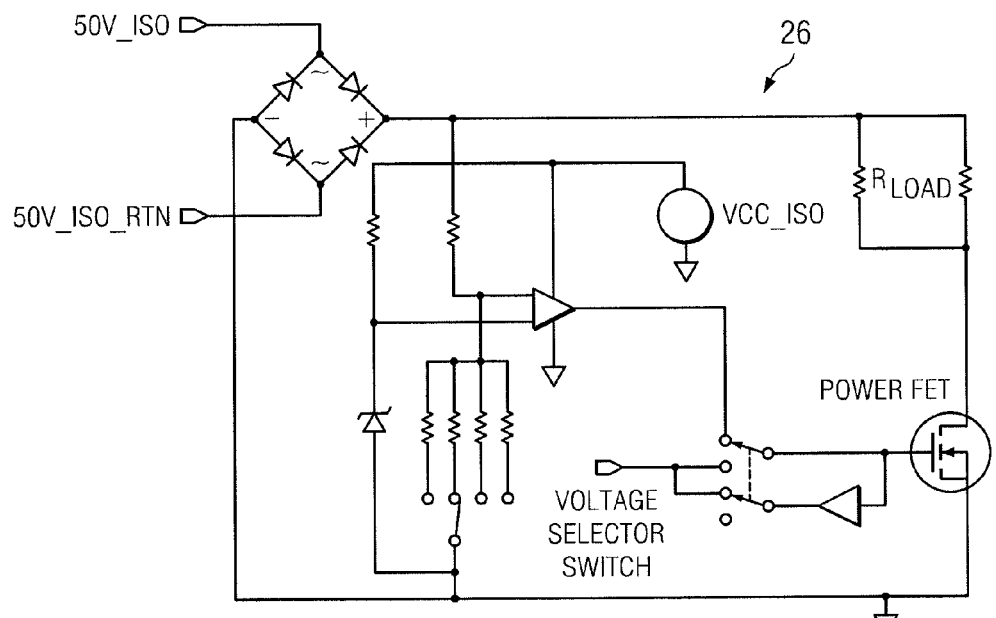
FIG. 7 illustrates an example of external load that may be used with the test card of FIG. 3.

FIG. 7 illustrates an example of external load 26 that may be used with test card 20. External load 26 may have any suitable voltage input capability, for example, a capability with a value in the range of 30 to 45, 45 to 50, 50 to 60, or greater than 60 volts. External load 26 may have any suitable power capability, for example, a capability with a value in the range of 2000 to 3000 or greater than 3000 W. In certain embodiments, external load 26 may be able to perform load balancing to distribute the output power among different loads.

Modifications, additions, or omissions may be made to the systems and apparatuses disclosed herein without departing from the scope of the invention. The components of the systems and apparatuses may be integrated or separated. For example, the components of card 20 may be located on one or more boards 40. Moreover, the operations of the systems and apparatuses may be performed by more, fewer, or other components. For example, the operations of filter 82 and DC regulator 84 may be performed by one component, or the operations of charge storage device 54 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
   a plurality of port interfaces coupled to a circuit board;
   a plurality of charge storage devices coupled to the circuit board, each charge storage device associated with a port interface of the plurality of port interfaces; and
   a charge combiner coupled to the circuit board;
   each port interface configured to:
      receive a current of charge from one or more devices under test; and
      pump the charge to an associated charge storage device at a predetermined rate;
   each charge storage device configured to store the charge from an associated port interface;
   the charge combiner configured to:
      combine the charge from the plurality of charge storage devices to yield a combined charge; and
      feed the combined charge to an output regulator.

2. The apparatus of claim 1, wherein the output regulator is configured to feed the combined charge to at least one device under test.

3. The apparatus of claim 1, wherein the output regulator is configured to feed the combined charge to an external load, the external load configured to dissipate power of the combined charge.

4. The apparatus of claim 1, further comprising:
   a set of first switches, wherein each first switch is configured to operate in a closed state to feed the current from a port interface to an associated charge storage device.

5. The apparatus of claim 1, further comprising:
   a set of second switches, wherein each second switch is configured to operate in a closed state to feed the current from a charge storage device to the charge combiner.

6. The apparatus of claim 1, further comprising:
   a port monitor configured to monitor the current at each port interface.

7. The apparatus of claim 1, wherein at least one device under test conforms to a Power over Ethernet standard.

8. The apparatus of claim 1, wherein the charge combiner comprises a plurality of busses coupled together to yield a combined bus.

9. A method comprising:
   receiving, by each port interface of a plurality of port interfaces, a current of charge from one or more devices under test, each port interface associated with a charge storage device of a plurality of charge storage devices; and
   pumping, by each port interface, the charge to an associated charge storage device at a predetermined rate;
   storing, by each charge storage device, the charge from an associated port interface;
   combining, by a charge combiner, the charge from the plurality of charge storage devices to yield a combined charge; and
   feeding the combined charge to an output regulator.

10. The method of claim 9, further comprising:
feeding, by the output regulator, the combined charge to at least one device under test.

11. The method of claim 9, further comprising:
feeding, by the output regulator, the combined charge to an external load, the external load configured to dissipate power of the combined charge.

12. The method of claim 9, further comprising:
a set of first switches, wherein each first switch is configured to operate in a closed state to feed the current from a port interface to an associated charge storage device.

13. The method of claim 9, further comprising:
feeding, by each second switch of a set of second switches, the current from a charge storage device to the charge combiner.

14. The method of claim 9, further comprising:
monitoring, by a port monitor, the current at each port interface.

15. The method of claim 9, wherein at least one device under test conforms to a Power over Ethernet standard.

16. The method of claim 9, wherein the charge combiner comprises a plurality of busses coupled together to yield a combined bus.

17. An apparatus comprising:
a plurality of port interfaces coupled to a circuit board;
a plurality of charge storage devices coupled to the circuit board, each charge storage device associated with a port interface of the plurality of port interfaces;
a charge combiner coupled to the circuit board; and
an output regulator coupled to the circuit board;
each port interface configured to:
  receive a current of charge from one or more devices under test; and
  pump the charge to an associated charge storage device at a predetermined rate;
each charge storage device configured to store the charge from an associated port interface;
the charge combiner configured to:
  combine the charge from the plurality of charge storage devices to yield a combined charge; and
  feed the combined charge to the output regulator; and
the output regulator configured to feed the combined charge to the device under test and to an external load, the external load configured to dissipate power of the combined charge.

18. The apparatus of claim 17, further comprising:
a set of second switches, wherein each second switch is configured to operate in a closed state to feed the current from a charge storage device to the charge combiner.

19. The apparatus of claim 17, further comprising:
a port monitor configured to monitor the current at each port interface.

20. The apparatus of claim 17, wherein the charge combiner comprises a plurality of busses coupled together to yield a combined bus.

* * * * *